US005627461A

United States Patent [19]

Kimura

[11] Patent Number: 5,627,461

[45] Date of Patent: May 6, 1997

[54] REFERENCE CURRENT CIRCUIT CAPABLE OF PREVENTING OCCURRENCE OF A DIFFERENCE COLLECTOR CURRENT WHICH IS CAUSED BY EARLY VOLTAGE EFFECT

[75] Inventor: Katsuji Kimura, Tokyo, Japan

[73] Assignee: NEC Corporation, Tokyo, Japan

[21] Appl. No.: 354,137

[22] Filed: Dec. 6, 1994

[30] Foreign Application Priority Data

Dec. 8, 1993 [JP] Japan .................................... 5-308162
Dec. 28, 1993 [JP] Japan .................................... 5-336604

[51] Int. Cl.$^6$ ...................................................... G06F 7/556

[52] U.S. Cl. ............................................................ 323/312

[58] Field of Search .................................... 327/538, 539, 327/540, 542, 545, 350, 51, 52, 63, 65, 66, 560–561; 323/313, 315, 312; 330/257

[56] References Cited

U.S. PATENT DOCUMENTS

| | | | |
|---|---|---|---|
| 5,465,070 | 11/1995 | Koyama et al. | 327/350 |
| 5,481,218 | 1/1996 | Nordholt et al. | 327/350 |
| 5,488,329 | 1/1996 | Ridgers | 327/539 |
| 5,489,868 | 2/1996 | Gilbert | 327/351 |
| 5,521,544 | 5/1996 | Hatanaka | 327/356 |

FOREIGN PATENT DOCUMENTS 2007055 5/1979 United Kingdom .

OTHER PUBLICATIONS by A.G. Van Lienden et al., "Special Correspondence", *IEEE Journal of Solid-State Circuits*, vol. SC-22, No. 6, Dec. 1987, pp. 1139–1143.

*Primary Examiner*—Aditya Krishnan
*Attorney, Agent, or Firm*—Young & Thompson

[57] ABSTRACT

A reference current circuit comprises transistors $Q_1$, $Q_2$, $Q_3$, and $Q_4$ and resistors $R_1$ and $R_2$. The resistor $R_1$ is connected between base and collector electrodes of the transistor $Q_1$. The resistor $R_2$ is connected between base and collector electrodes of the transistor $Q_3$. Emitter electrodes of the transistors $Q_1$ and $Q_2$ are connected to ground. The collector of the transistor $Q_1$ is connected to a base electrode of the transistor $Q_2$. The base electrode of the transistor $Q_1$ is connected to the collector electrode of the transistor $Q_4$. The collector electrode of the transistor $Q_2$ is connected to the base electrode of the transistor $Q_3$. Emitter electrodes of the transistors $Q_3$ and $Q_4$ are connected to a power supply terminal $V_{CC}$ which is supplied with a power supply voltage. Each of the transistors $Q_1$ and $Q_3$ has a first emitter area. Each of the transistors $Q_2$ and $Q_4$ has an emitter area which is equal to e times as large as the first emitter area, where e represents the base of natural logarithm. The reference current circuit may comprise four MOS transistors $M_1$, $M_2$, $M_3$, and $M_4$ instead of the resistors $Q_1$ to $Q_4$. In this event, each of the MOS transistors $M_1$ and $M_3$ has a first transconductance. Each of the MOS transistors $M_2$ and $M_4$ has a transconductance which is equal to four times as large as the first transconductance.

28 Claims, 10 Drawing Sheets

REFERENCE CURRENT CIRCUIT CAPABLE OF PREVENTING OCCURRENCE OF A DIFFERENCE COLLECTOR CURRENT WHICH IS CAUSED BY EARLY VOLTAGE EFFECT

BACKGROUND OF THE INVENTION

This invention relates to a reference current circuit and a reference voltage circuit.

A conventional reference current circuit is disclosed in IEEE Journal of Solid-State Circuits, Vol. SC-22, No. 6, pp. 1139–1143, Dec. 1987.

In the manner which will later be described more in detail, the conventional reference current circuit comprises a primary pair of first and second transistors and a secondary pair of third and fourth transistors. The first transistor has a first emitter electrode connected to ground through a resistor. The second transistor has a second emitter electrode grounded and a second base electrode connected to a first base electrode of the first transistor. The third transistor has a third emitter electrode connected to a power supply terminal which is supplied with a power supply voltage from a power supply unit. The third transistor has a third collector electrode connected to a first collector electrode of the first transistor. The fourth transistor has a fourth emitter electrode connected to the power supply terminal and a fourth base electrode connected to a third base electrode of the third transistor. The fourth transistor has a fourth collector electrode connected to the fourth base electrode of the fourth transistor and a first collector electrode of the first transistor.

A fifth transistor has a fifth emitter electrode connected to the power supply terminal and a fifth electrode connected to the third collector electrode of the third transistor. A sixth transistor has a sixth emitter electrode grounded and a sixth collector electrode connected to a fifth collector electrode of the fifth transistor. The fifth transistor has a fifth base electrode connected to the sixth collector electrode of the sixth transistor and the first base electrode of the first transistor.

The first transistor has an emitter area which is Ki times as large as a unit emitter area of a unit transistor. Each of the second through the fourth transistors has an emitter area which is equal to the unit emitter area. Each of the fifth and the sixth transistors has an emitter area which is two times as large as the unit emitter area. Inasmuch as the fifth transistor has the emitter area which is two times as large as the unit emitter area of the unit transistor, a collector current of the first transistor is almost equal to a collector current of the second transistor.

However, in this conventional reference current circuit, a difference collector current is caused by Early voltage effect in response to a change of the power supply voltage. As a result, it is hardly possible in the conventional reference current circuit to prevent occurrence of the difference base emitter voltage which is caused by Early voltage effect.

It is hardly possible in the conventional reference current circuit to change the reference current circuit into a reference voltage circuit.

The conventional reference current circuit has a large amount of consumption current.

SUMMARY OF THE INVENTION

It is therefore an object of the present invention to provide a reference current circuit or a reference voltage current which is capable of preventing occurrence of a difference collector current which is caused by Early voltage effect in response to a change of a power supply voltage.

It is another object of this invention to provide a reference current circuit or a reference voltage circuit which is capable of easily changing the reference current circuit or the reference voltage circuit into the reference voltage circuit or the reference current circuit.

It is still another object of this invention to provide a reference current circuit or a reference voltage circuit which has a small amount of consumption current.

Other objects of this invention will become clear as the description proceeds.

According to a first aspect of this invention, there is provided a reference current circuit which comprises (A) a primary pair of first and second transistors, the first transistor having a first emitter electrode grounded and a first emitter area, the second transistor having a second base electrode connected to a first collector electrode of the first transistor, a second emitter electrode grounded, and a second emitter area which is equal to e times as large as the first emitter area, where e represents the base of natural logarithm; (B) a secondary pair of third and fourth transistors, the third transistor having a third base electrode connected to a second collector electrode of the second transistor, a third emitter electrode connected to a power supply terminal which is supplied with a power supply voltage, and a third emitter area which is equal to the first emitter area, the fourth transistor having a fourth base electrode connected to a third collector electrode of the third transistor, a fourth collector electrode connected to a first base electrode of the first transistor, a fourth emitter electrode connected to the power supply terminal, and a fourth emitter area which is equal to the second emitter area; (C) a first resistor connected between the first collector electrode and the first base electrode; and (D) a second resistor connected between the second collector electrode and the second base electrode.

According to a second aspect of this invention, there is provided a reference voltage circuit which comprises (A) a primary pair of first and second transistors, the first transistor having a first emitter electrode grounded and a first emitter area, the second transistor having a second base electrode connected to a first collector electrode of the first transistor, a second emitter electrode grounded, and a second emitter area which is equal to e times as large as the first emitter area, where e represents the base of natural logarithm; (B) a secondary pair of third and fourth transistors, the third transistor having a third base electrode connected to a second collector electrode of the second transistor, a third emitter electrode connected to a power supply terminal which is supplied with a power supply voltage, and a third emitter area which is equal to the first emitter area, the fourth transistor having a fourth base electrode connected to a third collector electrode of the third transistor, a fourth collector electrode connected to a first base electrode of the first transistor, a fourth emitter electrode connected to the power supply terminal, and a fourth emitter area which is equal to the second emitter area; (C) a first resistor connected between the first collector electrode and the first base electrode; (D) a second resistor connected between the second collector electrode and the second base electrode; (E) a third resistor connected between the first base electrode and the fourth collector electrode; and (F) an output voltage terminal connected to a node of the third resistor and the fourth collector electrode.

According to a third aspect of this invention, there is provided a reference voltage circuit which comprises (A) a primary pair of first and second transistors, the first transistor having a first emitter electrode grounded and a first emitter area, the second transistor having a second base electrode connected to a first collector electrode of the first transistor, a second emitter electrode grounded, and a second emitter area which is equal to e times as large as the first emitter area, where e represents the base of natural logarithm; (B) a secondary pair of third and fourth transistors, the third transistor having a third base electrode connected to a second collector electrode of the second transistor, a third emitter electrode connected to a power supply terminal which is supplied with a power supply voltage, and a third emitter area which is equal to the first emitter area, the fourth transistor having a fourth base electrode connected to a third collector electrode of the third transistor, a fourth collector electrode connected to a first base electrode of the first transistor, a fourth emitter electrode connected to the power supply terminal, and a fourth emitter area which is equal to the second emitter area; (C) a first resistor connected between the first collector electrode and the first base electrode; (D) a second resistor connected between the second collector electrode and the second base electrode; (E) a third resistor connected between the first base electrode and the fourth collector electrode; (F) a first output voltage terminal connected to a node of the third resistor and the fourth collector electrode; (G) a fourth resistor connected between the second collector electrode and the third base electrode; and (H) a second output voltage terminal connected to a node of the fourth resistor and the second collector electrode.

According to a fourth aspect of this invention, there is provided a reference current circuit which comprises (A) a primary pair of first and second transistors, the first transistor having a first emitter electrode grounded and a first emitter area, the second transistor having a second base electrode connected to a first collector electrode of the first transistor, a second emitter electrode grounded, and a second emitter area which is equal to e times as large as the first emitter area, where e represents the base of natural logarithm; (B) a secondary pair of third and fourth transistors, the third transistor having a third collector electrode connected to a second collector electrode of the second transistor, a third emitter electrode connected to a power supply terminal which is supplied with a power supply voltage, and a third emitter area which is equal to the first emitter area, the fourth transistor having a fourth base electrode connected to a third base electrode of the third transistor, a fourth collector electrode connected to a first base electrode of the first transistor, a fourth emitter electrode connected to the power supply terminal, and a fourth emitter area which is equal to the first emitter area; (C) a resistor connected between the first collector electrode and the first base electrode; (D) a fifth transistor having a fifth emitter electrode connected to the power supply terminal, a fifth base electrode connected to the third base electrode, and a fifth collector electrode connected to the fifth base electrode; and (E) a sixth transistor having a sixth emitter electrode grounded, a sixth base electrode connected to the second collector electrode, and a sixth collector electrode connected to the fifth collector electrode.

According to a fifth aspect of this invention, there is provided a reference voltage circuit which comprises (A) a primary pair of first and second transistors, the first transistor having a first emitter electrode grounded and a first emitter area, the second transistor having a second base electrode connected to a first collector electrode of the first transistor, a second emitter electrode grounded, and a second emitter area which is equal to e times as large as the first emitter area, where e represents the base of natural logarithm; (B) a secondary pair of third and fourth transistors, the third transistor having a third emitter electrode connected to a power supply terminal which is supplied with a power supply voltage, and a third emitter area which is equal to the first emitter area, the fourth transistor having a fourth base electrode connected to a third base electrode of the third transistor, a fourth emitter electrode connected to the power supply terminal, and a fourth emitter area which is equal to the first emitter area; (C) a first resistor connected between the first collector electrode and the first base electrode; (D) a second resistor connected between the first base electrode and a fourth collector electrode of the fourth transistor, the second resistor having a primary resistance value; (E) a third resistor connected between a second collector electrode of the second transistor and a third collector electrode of the third transistor, the third resistor having a secondary resistance value which is equal to the primary resistance value; (F) a fifth transistor having a fifth emitter electrode connected to the power supply terminal, a fifth base electrode connected to the third base electrode, and a fifth collector electrode connected to the fifth base electrode; and (G) a sixth transistor having a sixth emitter electrode grounded, a sixth base electrode connected to the second collector electrode, and a sixth collector electrode connected to the fifth collector electrode.

According to a sixth aspect of this invention, there is provided a reference voltage circuit which comprises (A) a primary pair of first and second transistors, the first transistor having a first emitter electrode grounded and a first emitter area, the second transistor having a second base electrode connected to a first base electrode of the first transistor, and a second emitter area which is equal to e times as large as the first emitter area, where e represents the base of natural logarithm; (B) a secondary pair of third and fourth transistors, the third transistor having a third collector electrode connected to a second collector electrode of the second transistor, a third emitter electrode connected to a power supply terminal which is supplied with a power supply voltage, and a third emitter area which is equal to the first emitter area, the fourth transistor having a fourth base electrode connected to a third base electrode of the third transistor, a fourth collector electrode connected to the third and the fourth base electrodes and a first collector electrode of the first transistor, a fourth emitter electrode connected to the power supply terminal, and a fourth emitter area which is equal to the first emitter area; (C) a first resistor connected between the first emitter electrode and ground; (D) a fifth transistor having a fifth base electrode connected to the third collector electrode, a fifth emitter electrode connected to the power supply terminal, and a fifth emitter area which is equal to two times as large as the first emitter area; (E) a sixth transistor having a sixth base electrode connected to the second base electrode, a sixth collector electrode connected to the sixth base electrode, a sixth emitter electrode grounded, and a sixth emitter area which is equal to the fifth emitter area; (F) a second resistor connected between a fifth collector electrode of the fifth transistor and the sixth collector electrode of the sixth transistor; and (G) an output voltage terminal connected to a node of the fifth collector electrode and the second collector electrode.

According to a seventh aspect of this invention, there is provided a reference current circuit which comprises (A) a primary pair of first and second MOS transistors, the first MOS transistor having a first source electrode grounded and a first transconductance, the second MOS transistor having a second gate electrode connected to a first drain electrode of the first MOS transistor, a second source electrode grounded, and a second transconductance which is equal to four times as large as the first transconductance; (B) a secondary pair of third and fourth MOS transistors, the third MOS transistor having a third gate electrode connected to a second drain electrode of the second MOS transistor, a third source electrode connected to a power supply terminal which is supplied with a power supply voltage, and a third transconductance which is equal to the first transconductance, the fourth MOS transistor having a fourth gate electrode connected to a third drain electrode of the third MOS transistor, a fourth electrode connected to a first gate electrode of the first MOS transistor, a fourth source electrode connected to the power supply terminal, and a fourth transconductance which is equal to the second transconductance; (C) a first resistor connected between the first drain electrode and the first gate electrode; and (D) a second resistor connected between the second drain electrode and the second gate electrode.

According to an eighth aspect of this invention, there is provided a reference voltage circuit which comprises (A) a primary pair of first and second MOS transistors, the first MOS transistor having a first source electrode grounded and a first transconductance, the second MOS transistor having a second gate electrode connected to a first drain electrode of the first MOS transistor, a second source electrode grounded, and a second transconductance which is equal to four times as large as the first transconductance; (B) a secondary pair of third and fourth MOS transistors, the third MOS transistor having a third gate electrode connected to a second drain electrode of the second MOS transistor, a third source electrode connected to a power supply terminal which is supplied with a power supply voltage, and a third transconductance which is equal to the first transconductance, the fourth MOS transistor having a fourth gate electrode connected to a third drain electrode of the third MOS transistor, a fourth drain electrode connected to a first gate electrode of the first MOS transistor, a fourth source electrode connected to the power supply terminal, and a fourth transconductance which is equal to the second transconductance; (C) a first resistor connected between the first drain electrode and the first gate electrode; (D) a second resistor connected between the second drain electrode and the second gate electrode; (E) a third resistor connected between the first gate electrode and the fourth drain electrode; and (F) an output voltage terminal connected to a node of the third resistor and the fourth drain electrode.

According to a ninth aspect of this invention, there is provided a reference voltage circuit which comprises (A) a primary pair of first and second MOS transistors, the first MOS transistor having a first source electrode grounded and a first transconductance, the second MOS transistor having a second gate electrode connected to a first drain electrode of the first MOS transistor, a second source electrode grounded, and a second transconductance which is equal to four times as large as the first transconductance; (B) a secondary pair of third and fourth MOS transistors, the third transistor having a third gate electrode connected to a second drain electrode of the second MOS transistor, a third source electrode connected to a power supply terminal which is supplied with a power supply voltage, and a third transconductance which is equal to the first transconductance, the fourth MOS transistor having a fourth gate electrode connected to a third drain electrode of the third MOS transistor, a fourth drain electrode connected to a first gate electrode of the first MOS transistor, a fourth source electrode connected to the power supply terminal, and a fourth transconductance which is equal to the second transconductance; (C) a first resistor connected between the first drain electrode and the first gate electrode; (D) a second resistor connected between the second drain electrode and the second gate electrode; (E) a third resistor connected between the first gate electrode and the fourth drain electrode; (F) a first output voltage terminal connected to a node of the third resistor and the fourth drain electrode; (G) a fourth resistor connected between the second drain electrode and the third gate electrode; and (H) a second output voltage terminal connected to a node of the fourth resistor and the second drain electrode.

According to a tenth aspect of this invention, there is provided a reference current circuit which comprises (A) a primary pair of first and second MOS transistors, the first MOS transistor having a first source electrode grounded and a first transconductance, the second MOS transistor having a second gate electrode connected to a first drain electrode of the first MOS transistor, a second gate electrode grounded, and a second transconductance which is equal to four times as large as the first transconductance; (B) a secondary pair of third and fourth MOS transistors, the third MOS transistor having a third drain electrode connected to a second drain electrode of the second MOS transistor, a third source electrode connected to a power supply terminal which is supplied with a power supply voltage, and a third transconductance which is equal to the first transconductance, the fourth MOS transistor having a fourth gate electrode connected to a third gate electrode of the third MOS transistor, a fourth drain electrode connected to a first gate electrode of the first MOS transistor, a fourth source electrode connected to the power supply terminal, and a fourth transconductance which is equal to the first transconductance; (C) a resistor connected between the first drain electrode and the first gate electrode; (D) a fifth MOS transistor having a fifth source electrode connected to the power supply terminal, a fifth gate electrode connected to the third gate electrode, and a fifth drain electrode connected to the fifth gate electrode; and (E) a sixth MOS transistor having a sixth source electrode grounded, a sixth gate electrode connected to the second drain electrode, and a sixth drain electrode connected to the fifth drain electrode.

According to an eleventh aspect of this invention, there is provided a reference voltage circuit which comprises (A) a primary pair of first and second MOS transistors, the first MOS transistor having a first source electrode grounded and a first transconductance, the second MOS transistor having a second gate electrode connected to a first drain electrode of the first MOS transistor, a second source electrode grounded, and a second transconductance which is equal to four times as large as the first transconductance; (B) a secondary pair of third and fourth MOS transistors, the third MOS transistor having a third source electrode connected to a power supply terminal which is supplied with a power supply voltage, and a third transconductance which is equal to the first transconductance, the fourth MOS transistor having a fourth gate electrode connected to a third gate electrode of the third MOS transistor, a fourth source electrode connected to the power supply terminal, and a fourth transconductance which is equal to the first transconductance; (C) a first resistor connected between the first drain electrode and the first base electrode; (D) a second resistor connected between the first gate electrode and a fourth drain electrode of the fourth MOS transistor, the second resistor having a primary resistance value; (E) a third resistor connected between a second drain electrode of the second MOS transistor and a third drain electrode of the third MOS transistor, the third resistor having a secondary resistance value which is equal to the primary resistance value; (F) a fifth MOS transistor having a fifth source electrode connected to the power supply terminal, a fifth gate electrode connected to the third gate electrode, and a fifth drain electrode connected to the fifth gate electrode; and (G) a sixth MOS transistor having a sixth source electrode grounded, a sixth gate electrode connected to the second drain electrode, and a sixth drain electrode connected to the fifth drain electrode.

According to a twelfth aspect of this invention, there is provided a reference voltage circuit which comprises (A) a primary pair of first and second MOS transistors, the first MOS transistor having a first source electrode grounded and a first transconductance, the second MOS transistor having a second gate electrode connected to a first gate electrode of the first MOS transistor, and a second transconductance which is equal to four times as large as the first transconductance; (B) a secondary pair of third and fourth MOS transistors, the third MOS transistor having a third drain electrode connected to a second drain electrode of the second MOS transistor, a third source electrode connected to a power supply terminal which is supplied with a power supply voltage, and a third transconductance which is equal to the first transconductance, the fourth MOS transistor having a fourth gate electrode connected to a third gate electrode of the third MOS transistor, a fourth drain electrode connected to the third and the fourth gate electrodes and a first drain electrode of the first MOS transistor, a fourth source electrode connected to the power supply terminal, and a fourth transconductance which is equal to the first transconductance; (C) a first resistor connected between the first source electrode and ground; (D) a fifth MOS transistor having a fifth gate electrode connected to the third drain electrode, a fifth source electrode connected to the power supply terminal, and a fifth transconductance which is equal to two times as large as the first transconductance; (E) a sixth MOS transistor having a sixth gate electrode connected to the second gate electrode, a sixth drain electrode connected to the sixth gate electrode, a sixth source electrode grounded, and a sixth transconductance which is equal to the fifth transconductance; (F) a second resistor connected between a fifth drain electrode of the fifth MOS transistor and the sixth drain electrode of the sixth MOS transistor; and (G) an output voltage terminal connected to a node of the fifth drain electrode and the second drain electrode.

DESCRIPTION OF THE PREFERRED EMBODIMENTS

Figure 1:
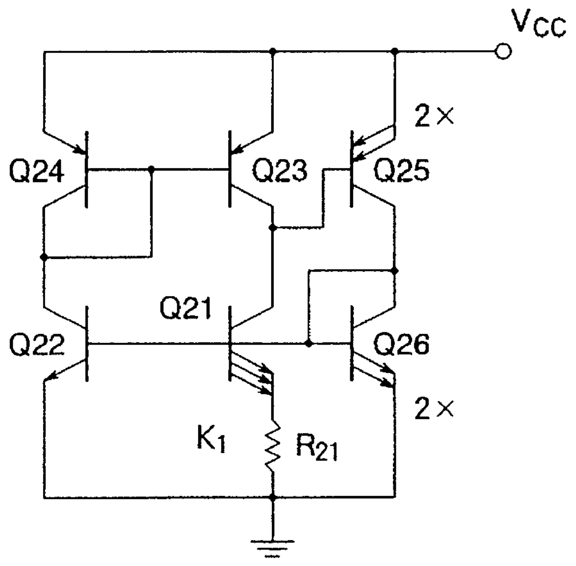
FIG. 1 (PRIOR ART)
FIG. 1 is a circuit diagram of a conventional reference current circuit.

Referring to FIG. 1, a conventional reference current circuit will be described for a better understanding of this invention. The conventional reference current circuit comprises a primary pair of transistors $Q_{21}$ and $Q_{22}$ and a secondary pair of transistors $Q_{23}$ and $Q_{24}$. The transistor $Q_{21}$ has an emitter electrode connected to ground through a resistor $R_{21}$. The transistor $Q_{22}$ has an emitter electrode grounded and a base electrode connected to a base electrode of the transistor $Q_{21}$. The transistor $Q_{23}$ has an emitter electrode connected to a power supply terminal $V_{CC}$ which is supplied with a power supply voltage from a power supply unit (not shown). The transistor $Q_{23}$ has a collector electrode connected to a collector electrode of the transistor $Q_{21}$. The transistor $Q_{24}$ has an emitter electrode connected to the power supply terminal $V_{CC}$ and a base electrode connected to a base electrode of the transistor $Q_{23}$. The transistor $Q_{24}$ has a collector electrode connected to the base electrode of the transistor $Q_{24}$ and a collector electrode of the transistor $Q_{21}$.

A transistor $Q_{25}$ has an emitter electrode connected to the power supply terminal $V_{CC}$ and a base electrode connected to the collector electrode of the transistor $Q_{23}$. A transistor $Q_{26}$ has an emitter electrode grounded and a collector electrode connected to a collector electrode of the transistor $Q_{25}$. The transistor $Q_{25}$ has a base electrode connected to the collector electrode of the transistor $Q_{26}$ and the base electrode of the transistor $Q_{21}$.

The transistor $Q_{21}$ has an emitter area which is Ki times as large as a unit emitter area of a unit transistor. Each of the transistors $Q_{22}$ to $Q_{24}$ has an emitter area which is equal to the unit emitter area. Each of the transistors $Q_{25}$ and $Q_{26}$ has an emitter area which is two times as large as the unit emitter area. Inasmuch as the transistor $Q_{25}$ has the emitter area which is two times as large as the unit emitter area of the unit transistor, a collector current of the transistor $Q_{21}$ is almost equal to a collector current of the transistor $Q_{22}$.

It will be assumed that Ici represents a collector current of the unit transistor, Vt represents a thermal voltage in an absolute temperature T, Is represents a saturation current in a collector electrode of the unit transistor, Ki represents an emitter area ratio, and $V_{BE}$ represents a base emitter voltage of the transistor. The collector current Ici is given by:

$$Ici=Ki\ Is\ \exp(V_{BE}/V_T) \quad (1)$$

where $V_T$ is given by (kT/q), where k represents Boltzman's constant, and q, the charge of a unit electron.

Inasmuch as the transistor $Q_{21}$ has the emitter area which is $K_1$ times as large as the unit emitter area, a difference base emitter voltage $\Delta V_{BE}$ between the transistors $Q_{21}$ and $Q_{22}$ is given by:

$$\Delta V_{BE}=V_{BE2}-V_{BE1}=V_T \ln(K_1)=R_1 I_1 \quad (2)$$

where $V_{BE1}$ represents a base emitter voltage of the transistor $Q_{21}$, $V_{BE2}$ represents a base emitter voltage of the transistor $Q_{22}$, and $I_1$ represents a collector current of the transistor $Q_{21}$. Herein, each of current amplification factors of the transistors $Q_{21}$ and $Q_{22}$ is equal to one.

The equation (2) is rewritten by a following equation (3).

$$I_1=\frac{V_T}{R_1}\ln(K_1)=\frac{kT}{R_1 q}\ln(K_1) \quad (3)$$

In this conventional reference current circuit, the difference base emitter voltage $\Delta V_{BE}$ is caused by Early voltage effect in response to a change of the power supply voltage. As a result, it is hardly possible in the conventional reference current circuit to prevent occurrence of the difference base emitter voltage $\Delta V_{BE}$ which is caused by Early voltage effect.

It is hardly possible in the conventional reference current circuit to change the reference current circuit into a reference voltage circuit.

The conventional reference current circuit has a large amount of consumption current.

Referring to FIGS. 2, 3, 4, and 5, the description will proceed to a reference current circuit according to a first embodiment of this invention.

Figure 2:
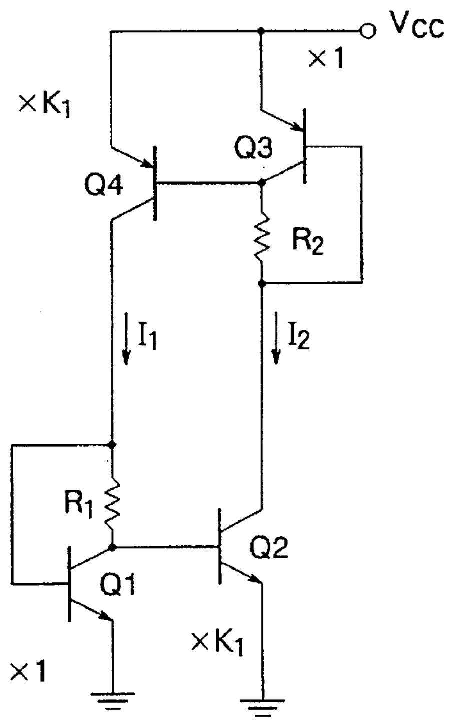
FIG. 2 is a circuit diagram of a reference current circuit according to a first embodiment of this invention.
Figure 3:
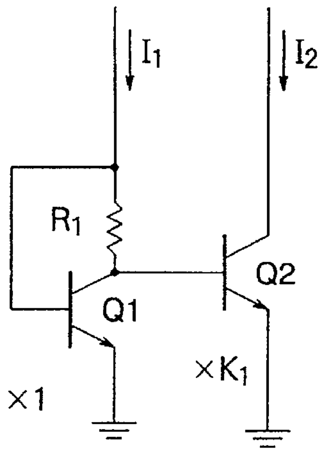
FIG. 3 is a circuit diagram of a part of the reference current circuit illustrated in FIG. 2.

In FIG. 2, the reference current circuit comprises a pair of first and second transistors $Q_1$ and $Q_2$, a pair of third and fourth transistors $Q_3$ and $Q_4$, and first and second resistors $R_1$ and $R_2$.

The first transistor $Q_1$ has a first emitter electrode grounded and a first emitter area. The second transistor $Q_2$ has a second base electrode connected to a first collector electrode of the first transistor $Q_1$, a second emitter electrode grounded, and a second emitter area. The second emitter area is equal to e times as large as the first emitter area, where e represents the base of natural logarithm.

The third transistor $Q_3$ has a third base electrode connected to a second collector electrode of the second transistor $Q_2$ and a third emitter electrode connected to a power supply terminal $V_{CC}$. The power supply terminal $V_{CC}$ is supplied with a power supply voltage from a power supply unit (not shown). The third transistor $Q_3$ has a third emitter area which is equal to the first emitter area. The fourth transistor $Q_4$ has a fourth base electrode connected to a third collector electrode of the third transistor $Q_3$ and a fourth collector electrode connected to a first base electrode of the first transistor $Q_1$. The fourth transistor $Q_4$ has a fourth emitter electrode connected to the power supply terminal $V_{CC}$ and a fourth emitter area which is equal to the second emitter area.

The first resistor $R_1$ is connected between the first collector electrode and the first base electrode and has a first resistance value $R_1$. The second resistor $R_2$ is connected between the second collector electrode and the second base electrode and has a second resistance value $R_2$ which is equal to the first resistance value.

A first voltage drop is caused across the first resistor $R_1$ when a first collector current flows in the first resistor $R_1$. A second voltage drop is caused across the second resistor $R_2$ when a second collector current flows in the resistor $R_2$. Each of the first and the second resistors $R_1$ and $R_2$ has a common temperature. Each of the first and the second voltage drops is substantially equal to a thermal voltage in the common temperature.

The first transistor $Q_1$, the second transistor $Q_2$, and the first resistor $R_1$ are shown in FIG. 2. It will be assumed that $I_1$ represents the first collector current of the first transistor $Q_1$, $I_2$ represents the second collector current of the second transistor $Q_2$, $K_1$ represents an emitter area ratio of the second transistor $R_2$ to the first transistor $Q_1$, $V_{BE1}$ represents a first base emitter voltage of the first transistor $Q_1$, $V_{BE2}$ represents a second base emitter voltage of the second transistor $Q_2$, and $\Delta V_{BE}$ represents a difference base emitter voltage between the first and the second base emitter voltages $V_{BE1}$ and $V_{BE2}$. The first collector current $I_1$, the second collector current $I_2$, and the difference base emitter voltage $\Delta V_{BE}$ are given by following equations (4), (5), and (6).

$$I_1=Is\ \exp(V_{BE1}/V_T) \quad (4)$$

$$I_2=K_1\ Is\ \exp(V_{BE2}/V_T) \quad (5)$$

$$\Delta V_{BE}=V_{BE1}-V_{BE2}=R_1 I_1 \quad (6)$$

A following equation (7) is given by the equations (4), (5), and (6).

$$I_2=K_1\ I_1\ \exp(-R_1 I_1/V_T) \quad (7)$$

Figure 4:
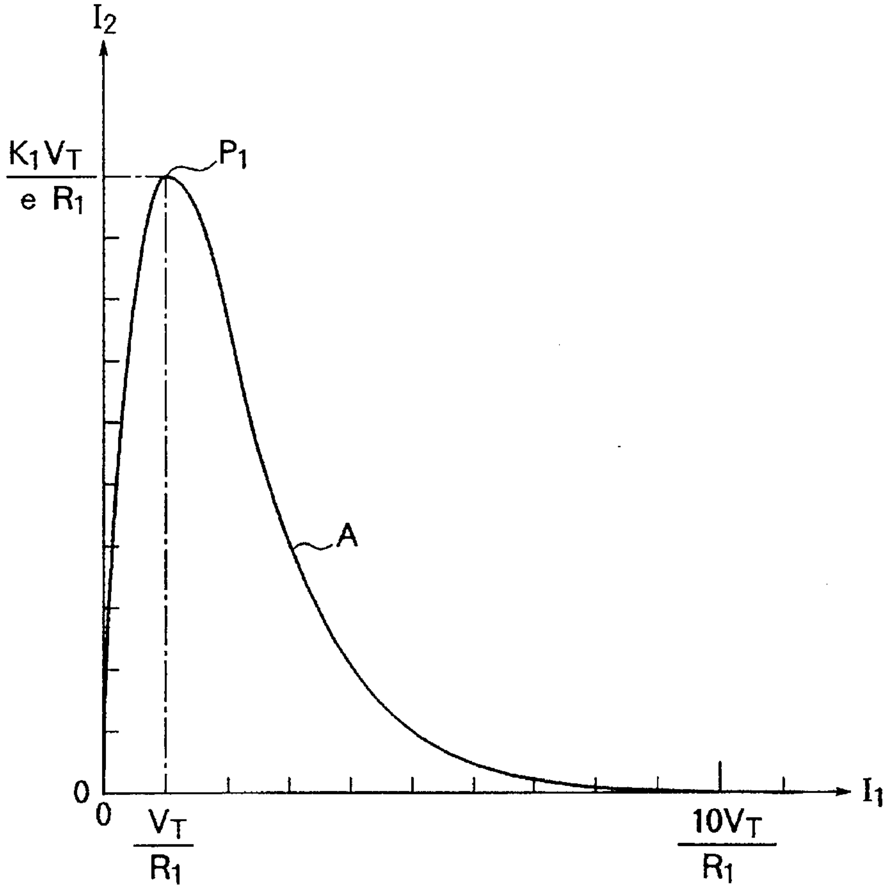
FIG. 4 is a graph for use in describing operation of the reference current circuit illustrated in FIGS. 2 and 3.

A curved line A in FIG. 4 shows a relation of $I_1$ and $I_2$ in the equation (7). As shown in FIG. 4, $I_2$ has a peak point $P_1$.

It will be assumed that $K_1$ is equal to e, where e represents the base of natural logarithm. A following equation (8) is given by the equation (7).

$$I_2=e\ I_1\ \exp(-R_1 I_1/V_T) \quad (8)$$

Figure 5:
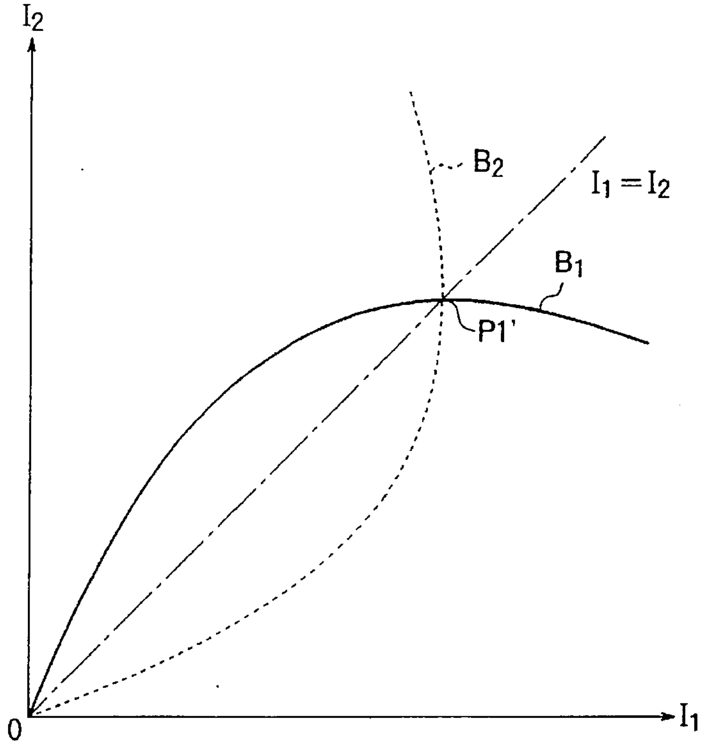
FIG. 5 is another graph for use in describing operation of the reference current circuit illustrated in FIGS. 2 and 3.

A curved line $B_1$ in FIG. 5 shows a relation of $I_1$ and $I_2$ in the equation (8). Each of the first and the second transistors $Q_1$ and $Q_2$ is an npn type bipolar transistor. Each of the third and the fourth transistors $Q_3$ and $Q_4$ is a pnp type bipolar transistor. A curved line $B_2$ in FIG. 5 shows a relation of $I_1$ and $I_2$ of the third and the fourth transistors $Q_3$ and $Q_4$. A curved line ($I_1=I_2$) is a line of symmetry of the curved lines $B_1$ and $B_2$. The curved line $B_1$ crosses the curved line $B_2$ at a peak point $P_1'$.

In FIG. 2, it will be assumed that the first resistance value $R_1$ of the first resistor $R_1$ is equal to the second resistance value $R_2$ of the second resistor $R_2$ and each of the first voltage drop across the first resistor $R_1$ and the second voltage drop across the second resistor $R_2$ is substantially equal to the thermal voltage in the absolute temperature T. In this case, each of the first through the fourth transistors $Q_1$ to $Q_4$ has a common operating point which is equal to the peak point $P_1$. Consequently, when a first change of $I_1$ and a second change of $I_2$ are caused by Early voltage effect in response to a change of the power supply voltage, the first change of $I_1$ and the second change of $I_2$ counteract each other. As a result, the reference current circuit is capable of preventing occurrence of a difference collector current of $I_1$ and $I_2$. Also, the reference current circuit has a consumption current value which is equal to 0.5 times as large as a consumption current value of the conventional reference current circuit illustrated in FIG. 1.

Figure 6:
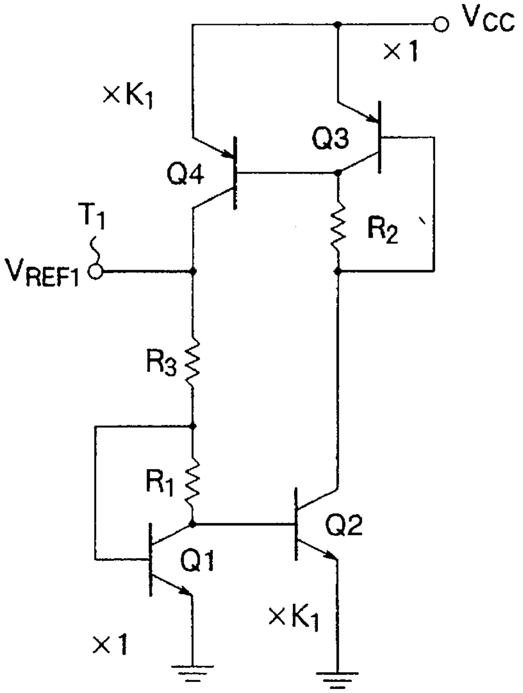
FIG. 6 is a circuit diagram of a reference voltage circuit according to a second embodiment of this invention.

Referring to FIG. 6, the description will proceed to a reference voltage circuit according to a second embodiment of this invention. Similar parts are designated by like reference numerals.

The reference voltage circuit further comprises a third resistor $R_3$ and a first output voltage terminal $T_1$ in the reference current circuit illustrated in FIG. 2. The third resistor $R_3$ is connected between the first base electrode of the first transistor $Q_1$ and the fourth collector electrode of the fourth transistor $Q_4$. The first output voltage terminal $T_1$ is connected to a node of the third resistor $R_3$ and the fourth collector electrode of the fourth transistor $Q_4$. The first output voltage terminal $T_1$ is supplied with a first output voltage $V_{REF1}$.

On the assumption that $I_1=I_2$, a following equation (9) is given by the equations (4) and (6).

$$\Delta V_{BE}=V_{BE1}-V_{BE2}=V_T 1_n(K_1) \quad (9)$$

In the reference voltage circuit, the difference base emitter voltage $\Delta V_{BE}$ has a positive temperature characteristic. Also, each of the first and the second base emitter voltages $V_{BE1}$ and $V_{BE2}$ has a negative temperature characteristic which is almost equal to −2.3 mV/°C. Consequently, the first output voltage $V_{REF1}$ may have a positive, negative, or zero temperature characteristic. On the assumption that the second resistance value $R_2$ is approximately equal to twenty-three times as large as the first resistance value $R_1$, the first output voltage $V_{REF1}$ has a zero temperature characteristic.

Figure 7:
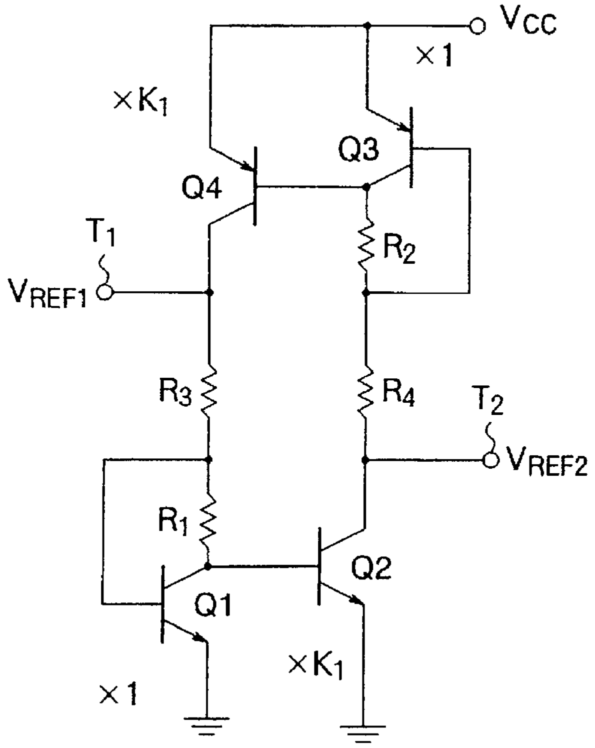
FIG. 7 is a circuit diagram of a reference voltage circuit according to a third embodiment of this invention.

Referring to FIG. 7, the description will proceed to a reference voltage circuit according to a third embodiment of this invention. Similar parts are designated by like reference numerals.

The reference voltage circuit further comprises a fourth resistor $R_4$ and a second output voltage terminal $T_2$ in the reference voltage illustrated in FIG. 6. The fourth resistor $R_4$ is connected between the second collector electrode of the second transistor $Q_2$ and the third base electrode of the third transistor $Q_3$. The second output voltage terminal $T_2$ is connected to a node of the fourth resistor $R_4$ and the second collector electrode of the second transistor $Q_2$. The second output voltage terminal $T_2$ is supplied with a second output voltage $V_{REF2}$. The second output voltage $V_{REF2}$ may have a positive, negative, or zero temperature characteristic which is independent from the temperature characteristic of the first output voltage $V_{REF1}$. The third and the fourth resistors $R_3$ and $R_4$ have third and fourth resistance values $R_3$ and $R_4$. On the assumption that the third resistance value $R_4$ is approximately equal to twenty-three times as large as the third resistance value $R_4$, the second output voltage $V_{REF2}$ has a zero temperature characteristic.

Figure 8:
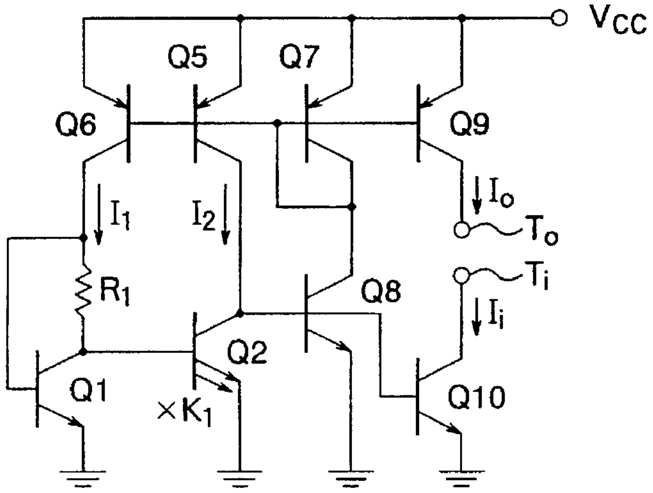
FIG. 8 is a circuit diagram of a reference current circuit according to a fourth embodiment of this invention.

Referring to FIG. 8, the description will proceed to a reference current circuit according to a fourth embodiment of this invention. Similar parts are designated by like reference numerals.

A fifth transistor $Q_5$ has a fifth collector electrode connected to the second collector electrode of the second transistor $Q_2$, a fifth emitter electrode connected to the power supply terminal $V_{CC}$, and a fifth emitter area which is equal to the first emitter area. A sixth transistor $Q_6$ has a sixth base electrode connected to a fifth base electrode of the fifth transistor $Q_5$, a sixth collector electrode connected to the first base electrode of the first transistor $Q_1$, a sixth emitter electrode connected to the power supply terminal $V_{CC}$, and a sixth emitter area which is equal to the first emitter area.

A seventh transistor $Q_7$ has a seventh emitter electrode connected to the power supply terminal $V_{CC}$, a seventh base electrode connected to the fifth base electrode of the fifth transistor $Q_5$, and a seventh collector electrode connected to the seventh base electrode. An eighth transistor $Q_8$ has an eighth emitter electrode grounded, an eighth base electrode connected to the second collector electrode of the second transistor $Q_2$, and an eighth collector connected to the seventh collector electrode of the seventh transistor $Q_7$.

A ninth transistor $Q_9$ has a ninth emitter electrode connected to the power supply terminal $V_{CC}$, a ninth base electrode connected to the seventh base electrode of the second terminal $Q_7$, and a ninth emitter electrode connected to an output current terminal To which is supplied with an output current Io. The ninth transistor $Q_9$ has a ninth emitter area which is equal to the first emitter area. A tenth transistor $Q_{10}$ has a tenth emitter electrode grounded, a tenth base electrode connected to the eighth base electrode of the eighth transistor $Q_8$, and a tenth collector electrode connected to an input current terminal Ti which is supplied with an input current Ii.

With this structure, on the assumption that $I_1=I_2$, the first collector current $I_1$ is given by a following equation (10).

$$I_1=\frac{V_T}{R_1}\, l_n(K)=\frac{kT}{R_1 q}\, l_n(K) \quad (10)$$

Consequently, the first and the second collector currents $I_1$ and $I_2$ are proportional to the absolute temperature T. As a result, the reference current circuit has a positive temperature characteristic. Inasmuch as the first and the second collector currents $I_1$ and $I_2$ are controlled by the seventh and the eighth transistors $Q_7$ and $Q_8$, the first and the second collector currents $I_1$ and $I_2$ are held at a constant current value even when the power supply voltage is changed.

Figure 9:
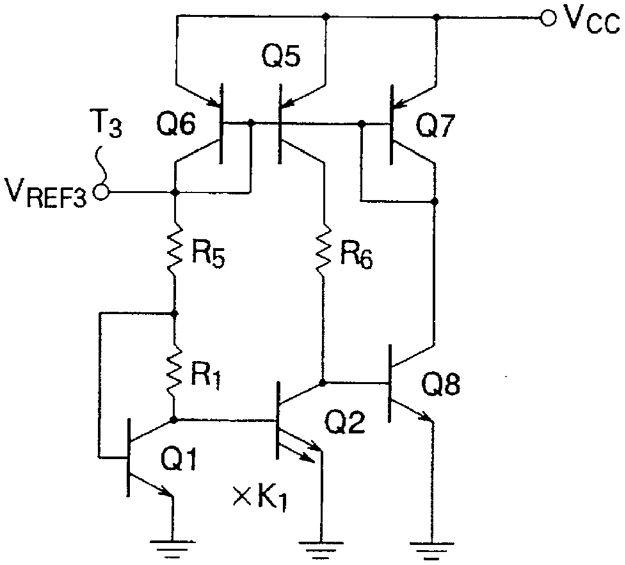
FIG. 9 is a circuit diagram of a reference voltage circuit according to a fifth embodiment of this invention.

Referring to FIG. 9, the description will proceed to a reference voltage circuit according to a fifth embodiment of this invention. Similar parts are designated by like reference numerals.

A fifth resistor $R_5$ is connected between the first base collector electrode of the first transistor $Q_1$ and the sixth collector electrode of the sixth transistor $Q_6$. The fifth resistor $R_5$ has a fifth resistance value $R_5$. A third output voltage terminal $T_3$ is connected to a node of the fifth resistor $R_5$ and the sixth collector electrode of the sixth transistor $Q_6$. The third output voltage terminal $T_3$ is supplied with a third output voltage $V_{REF3}$. A sixth resistor $R_6$ is connected between the second collector electrode of the second transistor $Q_2$ and the fifth collector electrode of the fifth transistor $Q_5$. The sixth resistor $R_6$ has a sixth resistance value $R_6$ which is equal to the fifth resistance value $R_5$ of the fifth resistor $R_5$. The third output voltage $V_{REF3}$ is given by:

$$\begin{aligned} V_{REF3} &= V_{BE1}+R_5 I_1 = V_{BE1}+\frac{R_5}{R_1}\,\Delta V_{BE} \\ &= V_{BE1}+\frac{R5}{R1}\,V_T l_n(K) \end{aligned} \quad (11)$$

Inasmuch as the first and the second collector currents $I_1$ and $I_2$ are proportional to the absolute temperature T, the difference base emitter voltage $\Delta V_{BE}$ is proportional to the absolute temperature T. The difference base emitter voltage $\Delta V_{BE}$ has a positive temperature characteristic. On the other hand, the first base emitter voltage $V_{BE1}$ has a negative temperature characteristic which is, for example, approximately equal to −2 mV/°C. As a result, the third output voltage $V_{REF3}$ may have a positive, negative, or zero temperature characteristic.

Figure 10:
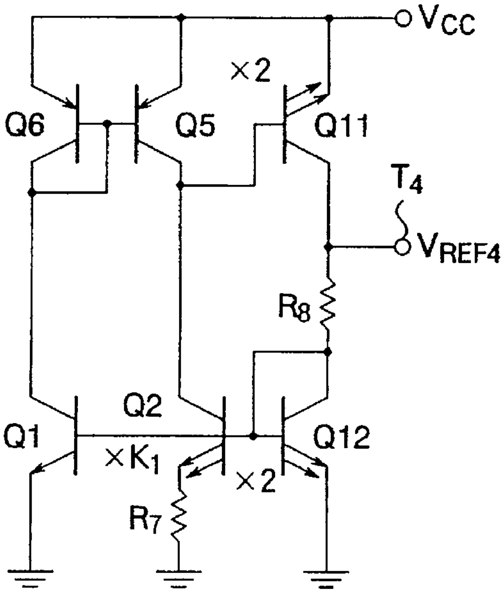
FIG. 10 is a circuit diagram of a reference voltage circuit according to a sixth embodiment of this invention.

Referring to FIG. 10, the description will proceed to a reference voltage circuit according to a sixth embodiment of this invention. Similar parts are designated by like reference numerals.

The second transistor $Q_2$ has the second base electrode connected to the first base electrode of the first transistor $Q_1$. The fifth transistor $Q_5$ has the fifth collector electrode connected to the second collector electrode of the second transistor $Q_2$. The sixth transistor $Q_6$ has the sixth collector electrode connected to the sixth base electrode of the sixth transistor $Q_6$.

An eleventh transistor $Q_{11}$ has an eleventh base electrode connected to the fifth collector electrode, an eleventh emitter electrode connected to the power supply terminal Vcc, and an eleventh emitter area which is equal to two times as large as the first emitter area. A twelfth transistor $Q_{12}$ has a twelfth base electrode connected to the second base electrode of the second transistor $Q_2$, a twelfth collector electrode connected to the twelfth base electrode, and a twelfth emitter electrode grounded. The twelfth transistor $Q_{12}$ has a twelfth emitter area which is equal to the eleventh emitter area.

A seventh resistor $R_7$ is connected between ground and the second emitter electrode of the second transistor $Q_2$. The seventh resistor $R_7$ has a seventh resistance value $R_7$. An eighth resistor $R_8$ is connected between an eleventh collector electrode of the eleventh transistor $Q_{11}$ and a twelfth collector electrode of the twelfth transistor $Q_{12}$. The eighth resistor $R_8$ has an eighth resistance value $R_8$. A fourth output voltage terminal $T_4$ is connected to a node of the eighth resistor $R_8$ and the eleventh collector electrode of the eleventh transistor $Q_{11}$. The fourth output voltage terminal $T_4$ is supplied with a fourth output voltage $V_{REF4}$. It will be assumed that the twelfth transistor $Q_{12}$ has a twelfth base emitter voltage $V_{BE12}$ and $\Delta V_{BE}$ represents a difference base emitter voltage between the second and the twelfth base emitter voltages $V_{BE2}$ and $V_{BE12}$. The fourth output voltage $V_{REF4}$ is given by:

$$\begin{aligned} V_{REF4} &= V_{BE12} + 2R_8 I_2 = V_{BE12} + 2\frac{R_3}{R_7}\,\Delta V_{BE} \\ &= V_{BE1} + 2\frac{R_8}{R_7}\,V_T l_n(K) \end{aligned} \tag{12}$$

The difference base emitter voltage $\Delta V_{BE}$ has a positive temperature characteristic. On the other hand, the twelfth base emitter voltage $V_{BE12}$ has a negative temperature characteristic. As a result, the fourth output voltage $V_{REF4}$ may have a positive, negative, or zero temperature characteristic.

Figure 11:
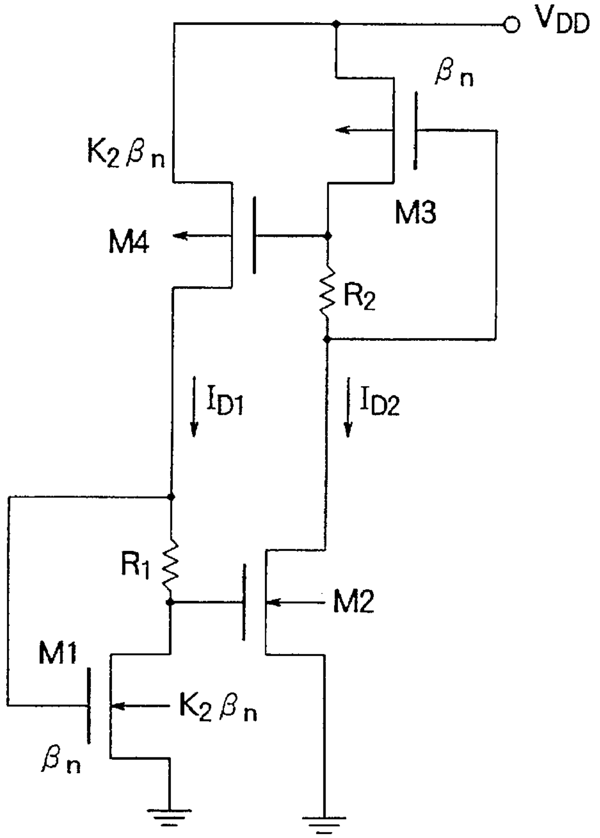
FIG. 11 is a circuit diagram of a reference current circuit according to a seventh embodiment of this invention.
Figure 12:
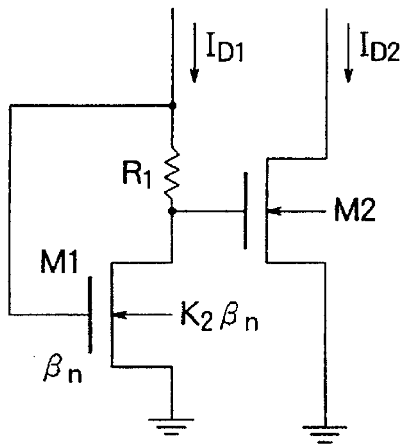
FIG. 12 is a circuit diagram of a part of the reference current circuit illustrated in FIG. 11.
Figure 13:
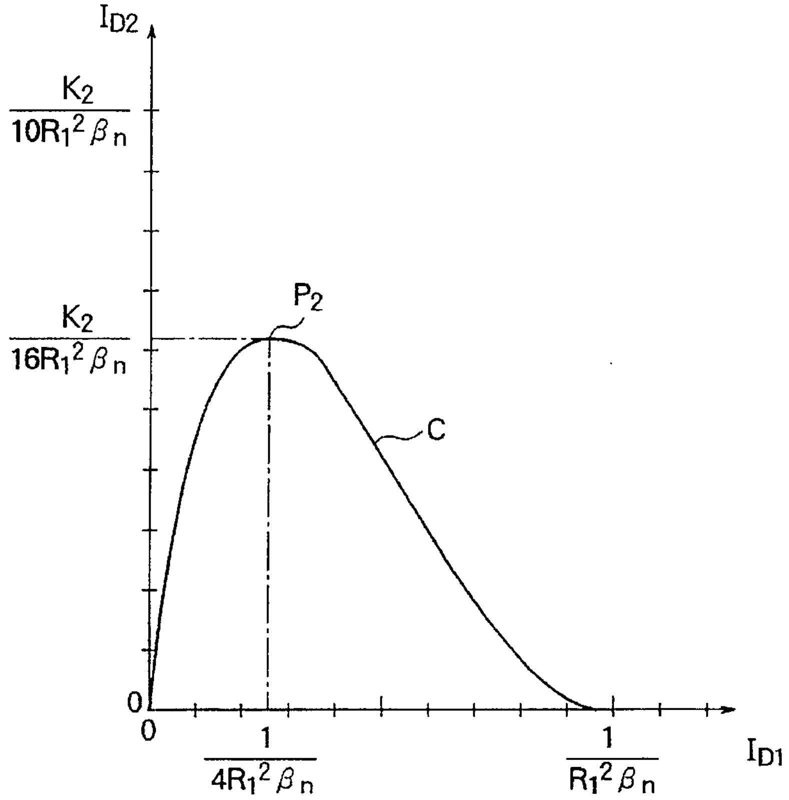
FIG. 13 is a graph for use in describing operation of the reference current circuit illustrated in FIGS. 11 and 12.

Referring to FIGS. 11, 12, and 13, the description will proceed to a reference current circuit according to a seventh embodiment of this invention.

The reference current circuit comprises a plurality of metal oxide semiconductor (MOS) field effect transistors (FET) which will hereafter be called MOS transistors.

In FIG. 11, the reference current circuit comprises a pair of first and second MOS transistors $M_1$ and $M_2$, a pair of third and fourth MOS transistors $M_3$ and $M_4$, and the first and the second resistors $R_1$ and $R_2$.

The first MOS transistor $M_1$ has a first source electrode grounded and a first transconductance. The second MOS transistor $M_2$ has a second gate electrode connected to a first drain electrode of the first MOS transistor $M_1$, a second source electrode grounded, and a second transconductance. The second transconductance is equal to four times as large as the first transconductance.

The third MOS transistor $M_3$ has a third gate electrode connected to a second drain electrode of the second MOS transistor $M_2$ and a third source electrode connected to a power supply terminal $V_{DD}$. The power supply terminal $V_{DD}$ is supplied with a power supply voltage from a power supply unit (not shown). The third MOS transistor $M_3$ has a third transconductance which is equal to the first transconductance. The fourth MOS transistor $M_4$ has a fourth gate electrode connected to a third drain electrode of the third MOS transistor $M_3$ and a fourth drain electrode connected to a first gate electrode of the first MOS transistor $M_1$. The fourth MOS transistor $M_4$ has a fourth source electrode connected to the power supply terminal $V_{DD}$ and a fourth transconductance which is equal to the second transconductance.

The first resistor $R_1$ is connected between the first drain electrode and the first gate electrode and has a first resistance value $R_1$. The second resistor $R_2$ is connected between the second drain electrode and the second gate electrode and has a second resistance value $R_2$ which is equal to the first resistance value. The transconductance is approximately equal to a gate (L/W) ratio.

A first voltage drop is caused across the first register $R_1$ when a first drain current flows in the first resistor $R_1$. A second voltage drop is caused across the second resistor $R_2$ when a second drain current flows in the resistor $R_2$. Each of the first and the second resistors $R_1$ and $R_2$ has a common temperature. Each of the first and the second voltage drops is substantially equal to a thermal voltage in the common temperature.

The MOS transistor may be operated in a saturation area. It is assumed that the MOS transistor has n channels and a transconductance $\beta_n$. In this event, a drain current $I_{Di}$ is given by a following equation (13) in the saturation area of the MOS transistor.

$$I_{Di}=K_j\beta_n(V_{GSi}-V_{TH})^2 \tag{13}$$

where $K_j$ represents an ability ratio or transconductance ratio to a unit MOS transistor, $V_{GSi}$ represents a gate source voltage, $V_{TH}$ represents a threshold voltage, $\beta_n$ is given by $[\mu_n(C_{ox}/2)(W/L)]$, $\mu_n$ represents an effective mobility of carrier, $C_{ox}$ represents a capacity of gate oxide film per unit area, W represents a width of gate electrode, and L represents a length of gate electrode.

The first MOS transistor $M_1$, the second MOS transistor $M_2$, and the first resistor $R_1$ are shown in FIG. 12. It will be assumed that $I_{D1}$ represents the first drain current of the first MOS transistor $M_1$, $I_{D2}$ represents the second drain current of the second MOS transistor $M_2$, $K_2$ represents a transconductance ratio of the second MOS transistor $M_2$ to the first MOS transistor $M_1$, $V_{GS1}$ represents a first gate source voltage of the first MOS transistor $M_1$, $V_{GS2}$ represents a second gate source voltage of the second MOS transistor $M_2$, and $\Delta V_{GS}$ represents a difference gate source voltage between the first and the second gate source voltages $V_{GS1}$ and $V_{GS2}$. The first drain current $I_{D1}$, the second drain current $I_{D2}$, and the difference gate source voltage $\Delta V_{GS}$ are given by following equations (14), (15), and (16).

$$I_{D1}=\beta_n(V_{GS1}-V_{TH})^2 \tag{14}$$

$$I_{D2}=K_2\beta_n(V_{GS2}-V_{TH})^2 \tag{15}$$

$$\Delta V_{GS}=V_{GS1}-V_{GS2}=I_{D1}R_1 \tag{16}$$

A following equation (17) is given by the equations (14) , (15), and (16).

$$I_{D2}=K_2\beta_n R_1{}^2 I_{D1}\left[\sqrt{I_{D1}-1/(R_1\sqrt{\beta_n}\ )}\ \right] \tag{17}$$

where $I_{D1}$ is given by $[I_{D1}\leqq 1/(R_1{}^2\beta_n)]$.

A curved line C in FIG. 4 shows a relation of $I_{D1}$ and $I_{D2}$ in the equation (17). As shown in FIG. 13, $I_{D2}$ has a peak point $P_2$.

On the assumption that $(dI_{D2}/dI_1)=0$ in the equation (17), $I_{D1}$ is given by a following equation (18).

$$I_{D1}=1/(R_1^2\beta_n),\ 1/4R_1^2\beta_n \quad (18)$$

Consequently, a peak value $I_{D2P}$ of the drain current $I_{D2}$ is given by a following equation (19).

$$I_{D2P}=1/(16R_1^2\beta_n)=(K_2/4)I_{D1} \quad (19)$$

In FIG. 11, it will be assumed that $K_2$ is equal to four, the first resistance value $R_1$ of the first resistor $R_1$ is equal to the second resistance value $R_2$ of the second resistor $R_2$, and each of the first voltage drop across the first resistor $R_1$ and the second voltage drop across the second resistor $R_2$ is substantially equal to the thermal voltage in the absolute temperature T. In this case, each of the first through the fourth MOS transistors $M_1$ to $M_4$ has a common operating point which is equal to the peak point $P_2$. Consequently, when a first change of $I_{D1}$ and a second change of $I_{D2}$ are caused by Early voltage effect in response to a change of the power supply voltage, the first change of $I_{D1}$ and the second change of $I_{D2}$ counteract each other. As a result, the reference current circuit is capable of preventing occurrence of a difference drain current of $I_{D1}$ and $I_{D2}$.

Figure 14:
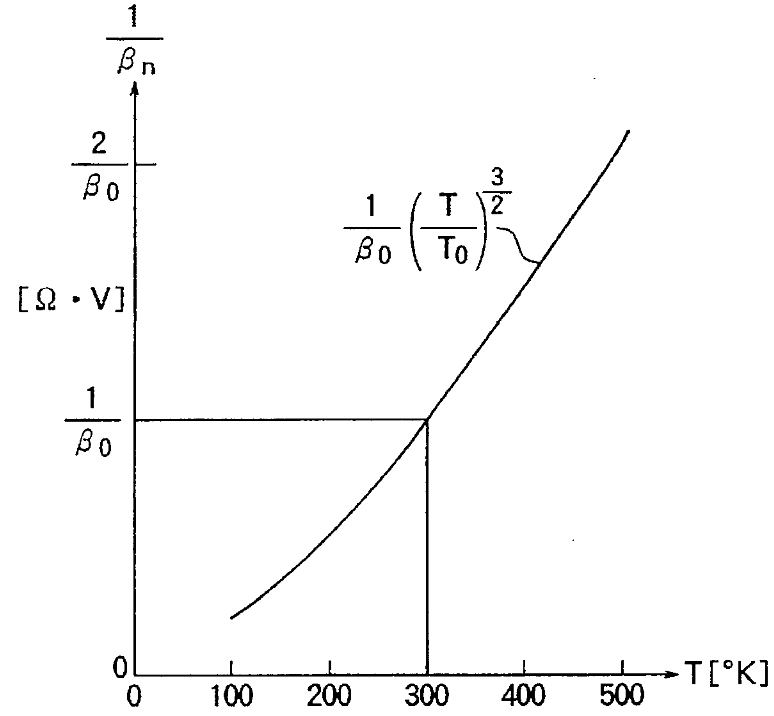
FIG. 14 is a circuit diagram of a reference voltage circuit according to an eighth embodiment of this invention.

The transconductance $\beta_n$ is given by a following equation (20).

$$\beta_n=\beta_0(T/To)^{-3/2} \quad (20)$$

where $\beta_0$ represents a transconductance in a temperature (300° K.). A relation of $(1/\beta_n)$ and an absolute temperature T is shown in FIG. 14.

A differential temperature coefficient $[TC_F(\beta_n)]$ of $\beta_n$ in the temperature (300° K.) is equal to −5,000 ppm/°C. A differential temperature coefficient $[TC_F(V_T)]$ of $V_T$ is positive. The differential temperature coefficient $[TC_F(\beta_n)]$ is negative and an absolute value which is equal to 1.5 times as large as an absolute value of the differential temperature coefficient $[T_{CF(VT)}]$. As shown in the equations (18) and (19), each of the drain currents $I_{D1}$ and $I_{D2}$ is proportional to $(1/\beta_n)$. Consequently, a differential temperature coefficient $[TC_F(1/\beta_n)]$ is equal to 5,000 ppm/°C. in the temperature (300° K.).

Figure 15:
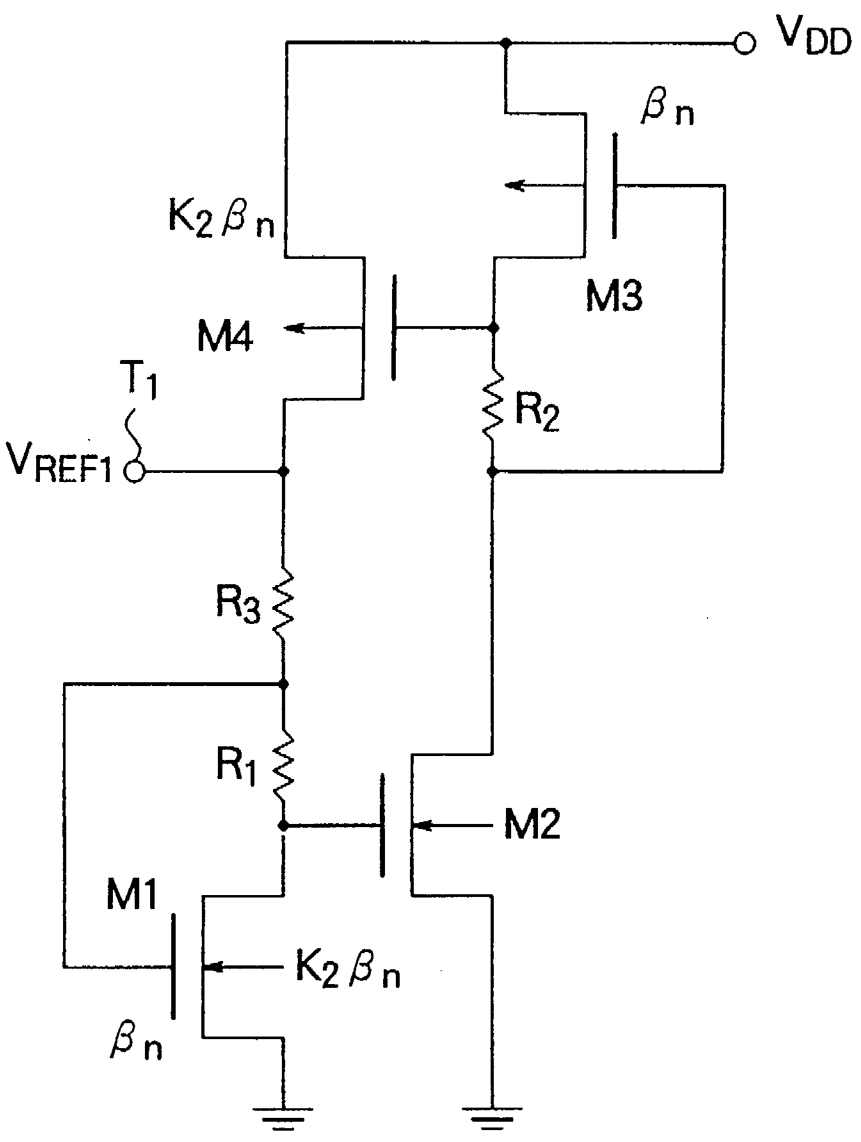
FIG. 15 is a circuit diagram of a reference voltage circuit according to a ninth embodiment of this invention.

Referring to FIG. 15, the description will proceed to a reference voltage circuit according to an eighth embodiment of this invention. Similar parts are designated by like reference numerals.

The reference voltage circuit further comprises the third resistor $R_3$ and the first output voltage terminal $T_1$ in the reference current circuit illustrated in FIG. 11. The third resistor $R_3$ is connected between the first gate electrode of the first MOS transistor $M_1$ and the fourth drain electrode of the fourth MOS transistor $M_4$. The first output voltage terminal $T_1$ is connected to the node of the third resistor $R_3$ and the fourth drain electrode of the fourth MOS transistor $M_4$. The first output voltage terminal $T_1$ is supplied with a first output voltage $V_{REF1}$.

On the assumption that $I_{D1}=I_{D2}$, a following equation (21) is given.

$$V_{REF1} = V_{GS1}+I_{D1}R_2 = \frac{1}{2R_1\beta_n}\left(1+\frac{R_2}{2R_1}\right)+V_{TH} \quad (21)$$

On the assumption that $V_{TH}\approx 0.7$ V, $V_{TH}$ has a temperature characteristic which is approximately equal to −2.3 mV/°C. Also, a voltage drop $(I_1R_1)$ has a positive temperature characteristic. Consequently, the first output voltage $V_{REF1}$ may have a positive, negative, or zero temperature characteristic.

Figure 16:
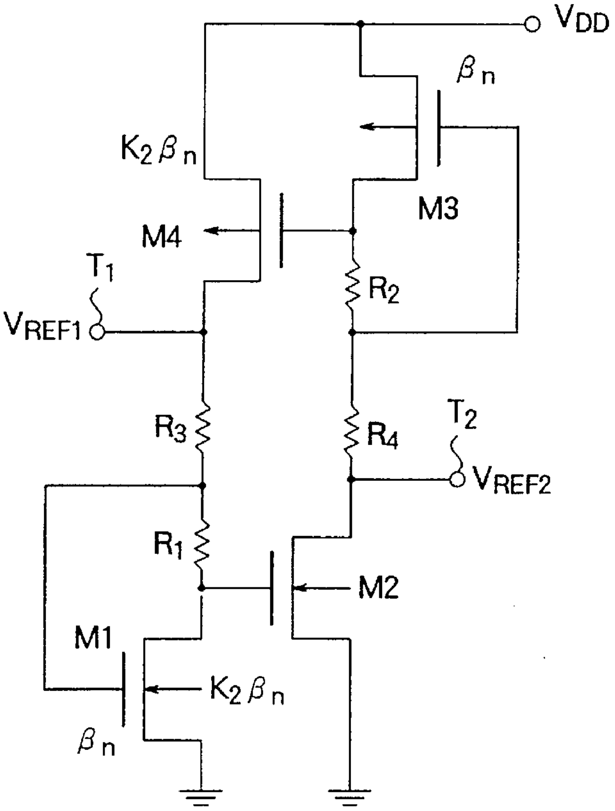
FIG. 16 is a circuit diagram of a reference current circuit according to a tenth embodiment of this invention.

Referring to FIG. 16, the description will proceed to a reference voltage circuit according to a ninth embodiment of this invention. Similar parts are designated by like reference numerals.

The reference voltage circuit further comprises the fourth resistor $R_4$ and the second output voltage terminal $T_2$ in the reference voltage illustrated in FIG. 15. The fourth resistor $R_4$ is connected between the second drain electrode of the second MOS transistor $M_2$ and the third gate electrode of the third MOS transistor $M_3$. The second output voltage terminal $T_2$ is connected to the node of the fourth resistor $R_4$ and the second drain electrode of the second MOS transistor $M_2$. The second output voltage terminal $T_2$ is supplied with the second output voltage $V_{REF2}$. The second output voltage $V_{REF2}$ may have a positive, negative, or zero temperature characteristic which is independent relative to the temperature characteristic of the first output voltage $V_{REF1}$. The third and the fourth resistors $R_3$ and $R_4$ have third and fourth resistance values $R_3$ and $R_4$.

Figure 17:
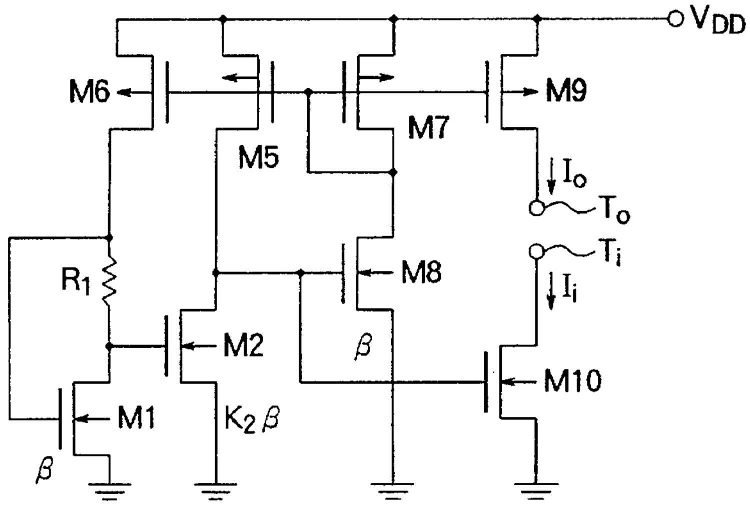
FIG. 17 is a graph for use in describing operation of the reference current circuit illustrated in FIG. 16.

Referring to FIG. 17, the description will proceed to a reference current circuit according to a tenth embodiment of this invention. Similar parts are designated by like reference numerals.

A fifth MOS transistor MS has a fifth drain electrode connected to the second drain electrode of the second MOS transistor $M_2$, a fifth source electrode connected to the power supply terminal $V_{DD}$, and a fifth transconductance which is equal to the first transconductance. A sixth MOS transistor $M_6$ has a sixth gate electrode connected to a fifth gate electrode of the fifth MOS transistor MS, a sixth drain electrode connected to the first gate electrode of the first MOS transistor $M_1$, a sixth source electrode connected to the power supply terminal $V_{DD}$, and a sixth transconductance which is equal to the first transconductance.

A seventh MOS transistor $M_7$ has a seventh source electrode connected to the power supply terminal $V_{DD}$, a seventh gate electrode connected to the fifth gate electrode of the fifth MOS transistor MS, and a seventh drain electrode connected to the seventh gate electrode. An eighth MOS transistor $M_8$ has an eighth source electrode grounded, an eighth gate electrode connected to the second drain electrode of the second MOS transistor $M_2$, and an eighth drain electrode connected to the seventh drain electrode of the seventh MOS transistor $M_7$.

A ninth MOS transistor $M_9$ has a ninth source electrode connected to the power supply terminal $V_{DD}$, a ninth gate electrode connected to the seventh gate electrode of the seventh MOS transistor $M_7$, and a ninth source electrode connected to the output current terminal To which is supplied with the output current Io. The ninth MOS transistor $M_9$ has a ninth transconductance which is equal to the first transconductance. A tenth MOS transistor $M_{10}$ has a tenth source electrode grounded, a tenth gate electrode connected to the eighth gate electrode of the eighth MOS transistor $M_8$, and a tenth drain electrode connected to the input current terminal Ti which is supplied with the input current Ii.

Inasmuch as the first and the second drain currents $I_{D1}$ and $I_{D2}$ are controlled by the seventh and the eighth MOS transistors $M_7$ and $M_8$, the first and the second drain currents $I_{D1}$ and $I_{D2}$ are held at a constant current value even when the power supply voltage is changed.

Figure 18:
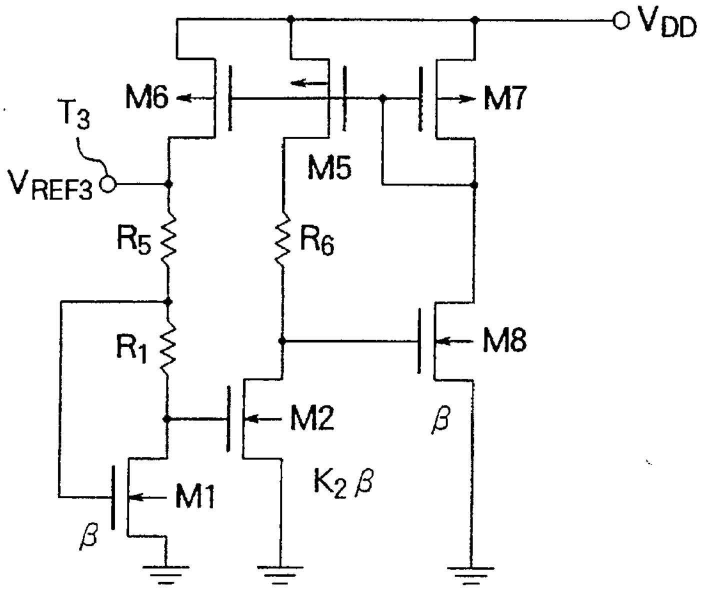
FIG. 18 is a circuit diagram of a reference voltage circuit according to an eleventh embodiment of this invention.

Referring to FIG. 18, the description will proceed to a reference voltage circuit according to an eleventh embodiment of this invention. Similar parts are designated by like reference numerals.

The fifth resistor $R_5$ is connected between the first gate drain electrode of the first MOS transistor $M_1$ and the sixth drain electrode of the sixth MOS transistor $M_6$. The fifth resistor $R_5$ has a fifth resistance value $R_5$. A third output voltage terminal $T_3$ is connected to a node of the fifth resistor $R_5$ and the sixth drain electrode of the sixth MOS transistor $M_6$. The third output voltage terminal $T_3$ is supplied with a third output voltage $V_{REF3}$. The sixth resistor $R_6$ is connected between the second drain electrode of the second MOS transistor $M_2$ and the fifth drain electrode of the fifth MOS transistor $M_5$. The sixth resistor $R_6$ has a sixth resistance value $R_6$ which is equal to the fifth resistance value $R_5$ of the fifth resistor $R_5$. The third output voltage $V_{REF3}$ is given by:

$$\begin{aligned} V_{REF3} &= V_{GS1} + R_5 I_{D1} = V_{GS1} + \frac{R_5}{R_1}\,\Delta V_{GS} \\ &= \frac{1}{\beta R_1}\left(1-\frac{1}{\sqrt{K_2}}\right)\left\{1+\frac{R_5}{R_1}\left(1-\frac{1}{\sqrt{K_2}}\right)\right\} + V_{TH} \end{aligned} \tag{22}$$

As illustrated in the equation (21), the third output voltage $V_{REF3}$ may have a positive, negative, or zero temperature characteristic.

Inasmuch as the first and the second drain currents $I_{D1}$ and $I_{D2}$ are controlled by the seventh and the eighth MOS transistors $M_7$ and $M_8$, the first and the second drain currents $I_{D1}$ and $I_{D2}$ are held at the constant value even when the power supply voltage is changed.

It will be assumed that the twelfth MOS transistor $M_{12}$ has a twelfth gate source voltage $V_{GS12}$ and $\Delta V_{GS}$ represents a difference gate source voltage between the second and the twelfth gate source voltages $V_{GS2}$ and $V_{GS12}$.

Inasmuch as a twelfth drain current $I_{D12}$ is the first or the second drain current $I_{D1}$ or $I_{D2}$, the twelfth drain current $I_{D12}$ is given by a following equation (23).

$$I_{D12}=\beta_n(V_{GS1}-V_{TH})^2 \tag{23}$$

Also, $V_{GS12}$ is given by a following equation (24).

$$\Delta V_{GS12}=V_{GS1}-V_{GS2}=R_1 I_{D2} \tag{24}$$

A following equation (25) is given by the equations (14), (15), (23), and (24).

$$I_{D1}=I_{D2}=I_{D12}=\frac{1}{\beta R_1^2}\left(1-\frac{1}{\sqrt{K_2}}\right)^2 \tag{25}$$

Also, the fourth output voltage $V_{REF4}$ is given by a following equation (26).

$$\begin{aligned} V_{REF4} &= V_{GS12} + R_8 I_{D12} = V_{GS1} + \frac{R_8}{R_7}\,\Delta V_{GS12} \\ &= \frac{1}{\beta_n R_7}\left(1-\frac{1}{\sqrt{K_2}}\right)\left\{1+\frac{R_8}{R_7}\left(1-\frac{1}{\sqrt{K_2}}\right)\right\} + V_{TH} \end{aligned} \tag{26}$$

Figure 19:
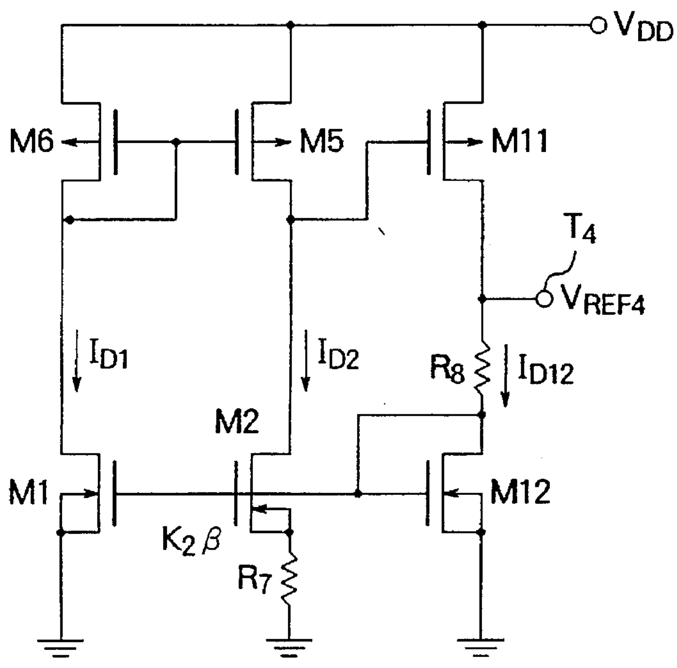
FIG. 19 is a circuit diagram of a reference voltage circuit according to a twelfth embodiment of this invention.

Referring to FIG. 19, the description will proceed to a reference voltage circuit according to a twelfth embodiment of this invention. Similar parts are designated by like reference numerals.

The second MOS transistor $M_2$ has the second gate electrode connected to the first gate electrode of the first MOS transistor $M_1$. The fifth MOS transistor $M_5$ has the fifth drain electrode connected to the second drain electrode of the second MOS transistor $M_2$. The sixth MOS transistor $M_6$ has the sixth drain electrode connected to the sixth gate electrode of the sixth MOS transistor $M_6$.

The eleventh MOS transistor $M_{11}$ has an eleventh gate electrode connected to the fifth drain electrode, an eleventh source electrode connected to the power supply terminal $V_{DD}$, and an eleventh transconductance which is equal to the first transconductance. A twelfth MOS transistor $M_{12}$ has a twelfth gate electrode connected to the second gate electrode of the second MOS transistor $M_2$, a twelfth drain electrode connected to the twelfth gate electrode, and a twelfth source electrode grounded. The twelfth MOS transistor $M_{12}$ has a twelfth transconductance which is equal to the eleventh transconductance.

The seventh resistor $R_7$ is connected between ground and the second source electrode of the second MOS transistor $M_2$. The seventh resistor $R_7$ has a seventh resistance value $R_7$. The eighth resistor $R_8$ is connected between an eleventh drain electrode of the eleventh MOS transistor $M_{11}$ and a twelfth drain electrode of the twelfth MOS transistor $M_{12}$. The eighth resistor $R_8$ has an eighth resistance value $R_8$. The fourth output voltage terminal $T_4$ is connected to a node of the eighth resistor $R_8$ and the eleventh drain electrode of the eleventh MOS transistor $M_{11}$. The fourth output voltage terminal $T_4$ is supplied with a fourth output voltage $V_{REF4}$.

As illustrated in the equation (21), the fourth output voltage $V_{REF4}$ may have a positive, negative, or zero temperature characteristic.

What is claimed is:

1. A reference current circuit comprising:

a primary pair of first and second transistors, said first transistor having a first emitter electrode grounded and a first emitter area, said second transistor having a second base electrode connected to a first collector electrode of said first transistor, a second emitter electrode grounded, and a second emitter area which is equal to e times as large as said first emitter area, where e represents the base of natural logarithm;

a secondary pair of third and fourth transistors, said third transistor having a third base electrode connected to a second collector electrode of said second transistor, a third emitter electrode connected to a power supply terminal which is supplied with a power supply voltage, and a third emitter area which is equal to said first emitter area, said fourth transistor having a fourth base electrode connected to a third collector electrode of said third transistor, a fourth collector electrode connected to a first base electrode of said first transistor, a fourth emitter electrode connected to said power supply terminal, and a fourth emitter area which is equal to said second emitter area;

a first resistor connected between said first collector electrode and said first base electrode; and a second resistor connected between said second collector electrode and said second base electrode.

2. A reference current circuit as claimed in claim 1, wherein said first resistor has a first resistance value, said second resistor having a second resistance value which is equal to said first resistance value.

3. A reference current circuit as claimed in claim 2, wherein a first voltage drop is caused across said first resistor, a second voltage being caused across said second resistor, each of said first and said second resistors having a common temperature, each of said first and said second voltage drops being substantially equal to a thermal voltage in said common temperature.

4. A reference voltage circuit comprising:

a primary pair of first and second transistors, said first transistor having a first emitter electrode grounded and a first emitter area, said second transistor having a second base electrode connected to a first collector electrode of said first transistor, a second emitter electrode grounded, and a second emitter area which is equal to e times as large as said first emitter area, where e represents the base of natural logarithm;

a secondary pair of third and fourth transistors, said third transistor having a third base electrode connected to a second collector electrode of said second transistor, a third emitter electrode connected to a power supply terminal which is supplied with a power supply voltage, and a third emitter area which is equal to said first emitter area, said fourth transistor having a fourth base electrode connected to a third collector electrode of said third transistor, a fourth collector electrode connected to a first base electrode of said first transistor, a fourth emitter electrode connected to said power supply terminal, and a fourth emitter area which is equal to said second emitter area;

a first resistor connected between said first collector electrode and said first base electrode;

a second resistor connected between said second collector electrode and said second base electrode;

a third resistor connected between said first base electrode and said fourth collector electrode; and an output voltage terminal connected to a node of said third resistor and said fourth collector electrode.

5. A reference voltage circuit as claimed in claim 4, wherein said first resistor has a first resistance value, said second resistor having a second resistance value which is equal to said first resistance value.

6. A reference voltage circuit as claimed in claim 5, wherein a first voltage drop is caused across said first resistor, a second voltage being caused across said second resistor, each of said first and said second resistors having a common temperature, each of said first and said second voltage drops being substantially equal to a thermal voltage in said common temperature.

7. A reference voltage circuit comprising:

a primary pair of first and second transistors, said first transistor having a first emitter electrode grounded and a first emitter area, said second transistor having a second base electrode connected to a first collector electrode of said first transistor, a second emitter electrode grounded, and a second emitter area which is equal to e times as large as said first emitter area, where e represents the base of natural logarithm;

a secondary pair of third and fourth transistors, said third transistor having a third base electrode connected to a second collector electrode of said second transistor, a third emitter electrode connected to a power supply terminal which is supplied with a power supply voltage, and a third emitter area which is equal to said first emitter area, said fourth transistor having a fourth base electrode connected to a third collector electrode of said third transistor, a fourth collector electrode connected to a first base electrode of said first transistor, a fourth emitter electrode connected to said power supply terminal, and a fourth emitter area which is equal to said second emitter area;

a first resistor connected between said first collector electrode and said first base electrode;

a second resistor connected between said second collector electrode and said second base electrode;

a third resistor connected between said first base electrode and said fourth collector electrode;

a first output voltage terminal connected to a node of said third resistor and said fourth collector electrode;

a fourth resistor connected between said second collector electrode and said third base electrode; and a second output voltage terminal connected to a node of said fourth resistor and said second collector electrode.

8. A reference voltage circuit as claimed in claim 7, wherein said first resistor has a first resistance value, said second resistor having a second resistance value which is equal to said first resistance value.

9. A reference voltage circuit as claimed in claim 8, wherein a first voltage drop is caused across said first resistor, a second voltage being caused across said second resistor, each of said first and said second resistors having a common temperature, each of said first and said second voltage drops being substantially equal to a thermal voltage in said common temperature.

10. A reference current circuit comprising:

a primary pair of first and second transistors, said first transistor having a first emitter electrode grounded and a first emitter area, said second transistor having a second base electrode connected to a first collector electrode of said first transistor, a second emitter electrode grounded, and a second emitter area which is equal to e times as large as said first emitter area, where e represents the base of natural logarithm;

a secondary pair of third and fourth transistors, said third transistor having a third collector electrode connected to a second collector electrode of said second transistor, a third emitter electrode connected to a power supply terminal which is supplied with a power supply voltage, and a third emitter area which is equal to said first emitter area, said fourth transistor having a fourth base electrode connected to a third base electrode of said third transistor, a fourth collector electrode connected to a first base electrode of said first transistor, a fourth emitter electrode connected to said power supply terminal, and a fourth emitter area which is equal to said first emitter area;

a resistor connected between said first collector electrode and said first base electrode;

a fifth transistor having a fifth emitter electrode connected to said power supply terminal, a fifth base electrode connected to said third base electrode, and a fifth collector electrode connected to said fifth base electrode; and a sixth transistor having a sixth emitter electrode grounded, a sixth base electrode connected to said second collector electrode, and a sixth collector electrode connected to said fifth collector electrode.

11. A reference current circuit as claimed in claim 10, wherein a voltage drop is caused across said resistor which has a temperature, said voltage drop being substantially equal to a thermal voltage in said temperature.

12. A reference voltage circuit comprising:

a primary pair of first and second transistors, said first transistor having a first emitter electrode grounded and a first emitter area, said second transistor having a second base electrode connected to a first collector electrode of said first transistor, a second emitter electrode grounded, and a second emitter area which is equal to e times as large as said first emitter area, where e represents the base of natural logarithm;

a secondary pair of third and fourth transistors, said third transistor having a third emitter electrode connected to a power supply terminal which is supplied with a power supply voltage, and a third emitter area which is equal to said first emitter area, said fourth transistor having a fourth base electrode connected to a third base electrode of said third transistor, a fourth emitter electrode connected to said power supply terminal, and a fourth emitter area which is equal to said first emitter area;

a first resistor connected between said first collector electrode and said first base electrode;

a second resistor connected between said first base electrode and a fourth collector electrode of said fourth transistor, said second resistor having a primary resistance value;

a third resistor connected between a second collector electrode of said second transistor and a third collector electrode of said third transistor, said third resistor having a secondary resistance value which is equal to said primary resistance value;

a fifth transistor having a fifth emitter electrode connected to said power supply terminal, a fifth base electrode connected to said third base electrode, and a fifth collector electrode connected to said fifth base electrode; and a sixth transistor having a sixth emitter electrode grounded, a sixth base electrode connected to said second collector electrode, and a sixth collector electrode connected to said fifth collector electrode.

13. A reference voltage circuit as claimed in claim 12, wherein a voltage drop is caused across said first resistor which has a temperature, said voltage drop being substantially equal to a thermal voltage in said temperature.

14. A reference voltage circuit comprising:

a primary pair of first and second transistors, said first transistor having a first emitter electrode grounded and a first emitter area, said second transistor having a second base electrode connected to a first base electrode of said first transistor, and a second emitter area which is equal to e times as large as said first emitter area, where e represents the base of natural logarithm;

a secondary pair of third and fourth transistors, said third transistor having a third collector electrode connected to a second collector electrode of said second transistor, a third emitter electrode connected to a power supply terminal which is supplied with a power supply voltage, and a third emitter area which is equal to said first emitter area, said fourth transistor having a fourth base electrode connected to a third base electrode of said third transistor, a fourth collector electrode connected to said third and said fourth base electrodes and a first collector electrode of said first transistor, a fourth emitter electrode connected to said power supply terminal, and a fourth emitter area which is equal to said first emitter area;

a first resistor connected between said first emitter electrode and ground, a fifth transistor having a fifth base electrode connected to said third collector electrode, a fifth emitter electrode connected to said power supply terminal, and a fifth emitter area which is equal to two times as large as said first emitter area;

a sixth transistor having a sixth base electrode connected to said second base electrode, a sixth collector electrode connected to said sixth base electrode, a sixth emitter electrode grounded, and a sixth emitter area which is equal to said fifth emitter area;

a second resistor connected between a fifth collector electrode of said fifth transistor and said sixth collector electrode of said sixth transistor; and an output voltage terminal connected to a node of said fifth collector electrode and said second collector electrode.

15. A reference current circuit comprising:

a primary pair of first and second MOS transistors, said first MOS transistor having a first source electrode grounded and a first transconductance, said second MOS transistor having a second gate electrode connected to a first drain electrode of said first MOS transistor, a second source electrode grounded, and a second transconductance which is equal to four times as large as said first transconductance;

a secondary pair of third and fourth MOS transistors, said third MOS transistor having a third gate electrode connected to a second drain electrode of said second MOS transistor, a third source electrode connected to a power supply terminal which is supplied with a power supply voltage, and a third transconductance which is equal to said first transconductance, said fourth MOS transistor having a fourth gate electrode connected to a third drain electrode of said third MOS transistor, a fourth electrode connected to a first gate electrode of said first MOS transistor, a fourth source electrode connected to said power supply terminal, and a fourth transconductance which is equal to said second transconductance;

a first resistor connected between said first drain electrode and said first gate electrode; and a second resistor connected between said second drain electrode and said second gate electrode.

16. A reference current circuit as claimed in claim 15, wherein said first resistor has a first resistance value, said second resistor having a second resistance value which is equal to said first resistance value.

17. A reference current circuit as claimed in claim 16, wherein a first voltage drop is caused across said first resistor, a second voltage being caused across said second resistor, each of said first and said second resistors having a common temperature, each of said first and said second voltage drops being substantially equal to a thermal voltage in said common temperature.

18. A reference voltage circuit comprising:

a primary pair of first and second MOS transistors, said first MOS transistor having a first source electrode grounded and a first transconductance, said second MOS transistor having a second gate electrode connected to a first drain electrode of said first MOS transistor, a second source electrode grounded, and a second transconductance which is equal to four times as large as said first transconductance;

a secondary pair of third and fourth MOS transistors, said third MOS transistor having a third gate electrode connected to a second drain electrode of said second MOS transistor, a third source electrode connected to a power supply terminal which is supplied with a power supply voltage, and a third transconductance which is equal to said first transconductance, said fourth MOS transistor having a fourth gate electrode connected to a third drain electrode of said third MOS transistor, a fourth drain electrode connected to a first gate electrode of said first MOS transistor, a fourth source electrode connected to said power supply terminal, and a fourth transconductance which is equal to said second transconductance;

a first resistor connected between said first drain electrode and said first gate electrode;

a second resistor connected between said second drain electrode and said second gate electrode;

a third resistor connected between said first gate electrode and said fourth drain electrode; and an output voltage terminal connected to a node of said third resistor and said fourth drain electrode.

19. A reference voltage circuit as claimed in claim 18, wherein said first resistor has a first resistance value, said second resistor having a second resistance value which is equal to said first resistance value.

20. A reference voltage circuit as claimed in claim 19, wherein a first voltage drop is caused across said first resistor, a second voltage being caused across said second resistor, each of said first and said second resistors having a common temperature, each of said first and said second voltage drops being substantially equal to a thermal voltage in said common temperature.

21. A reference voltage circuit comprising:

a primary pair of first and second MOS transistors, said first MOS transistor having a first source electrode grounded and a first transconductance, said second MOS transistor having a second gate electrode connected to a first drain electrode of said first MOS transistor, a second source electrode grounded, and a second transconductance which is equal to four times as large as said first transconductance;

a secondary pair of third and fourth MOS transistors, said third transistor having a third gate electrode connected to a second drain electrode of said second MOS transistor, a third source electrode connected to a power supply terminal which is supplied with a power supply voltage, and a third transconductance which is equal to said first transconductance, said fourth MOS transistor having a fourth gate electrode connected to a third drain electrode of said third MOS transistor, a fourth drain electrode connected to a first gate electrode of said first MOS transistor, a fourth source electrode connected to said power supply terminal, and a fourth transconductance which is equal to said second transconductance;

a first resistor connected between said first drain electrode and said first gate electrode;

a second resistor connected between said second drain electrode and said second gate electrode;

a third resistor connected between said first gate electrode and said fourth drain electrode;

a first output voltage terminal connected to a node of said third resistor and said fourth drain electrode;

a fourth resistor connected between said second drain electrode and said third gate electrode; and a second output voltage terminal connected to a node of said fourth resistor and said second drain electrode.

22. A reference voltage circuit as claimed in claim 21, wherein said first resistor has a first resistance value, said second resistor having a second resistance value which is equal to said first resistance value.

23. A reference voltage circuit as claimed in claim 22, wherein a first voltage drop is caused across said first resistor, a second voltage being caused across said second resistor, each of said first and said second resistors having a common temperature, each of said first and said second voltage drops being substantially equal to a thermal voltage in said common temperature.

24. A reference current circuit comprising:

a primary pair of first and second MOS transistors, said first MOS transistor having a first source electrode grounded and a first transconductance, said second MOS transistor having a second gate electrode connected to a first drain electrode of said first MOS transistor, a second gate electrode grounded, and a second transconductance which is equal to four times as large as said first transconductance;

a secondary pair of third and fourth MOS transistors, said third MOS transistor having a third drain electrode connected to a second drain electrode of said second MOS transistor, a third source electrode connected to a power supply terminal which is supplied with a power supply voltage, and a third transconductance which is equal to said first transconductance, said fourth MOS transistor having a fourth gate electrode connected to a third gate electrode of said third MOS transistor, a fourth drain electrode connected to a first gate electrode of said first MOS transistor, a fourth source electrode connected to said power supply terminal, and a fourth transconductance which is equal to said first transconductance;

a resistor connected between said first drain electrode and said first gate electrode;

a fifth MOS transistor having a fifth source electrode connected to said power supply terminal, a fifth gate electrode connected to said third gate electrode, and a fifth drain electrode connected to said fifth gate electrode; and a sixth MOS transistor having a sixth source electrode grounded, a sixth gate electrode connected to said second drain electrode, and a sixth drain electrode connected to said fifth drain electrode.

25. A reference current circuit as claimed in claim 24, wherein a voltage drop is caused across said resistor which has a temperature, said voltage drop being substantially equal to a thermal voltage in said temperature.

26. A reference voltage circuit comprising:

a primary pair of first and second MOS transistors, said first MOS transistor having a first source electrode grounded and a first transconductance, said second MOS transistor having a second gate electrode connected to a first drain electrode of said first MOS transistor, a second source electrode grounded, and a second transconductance which is equal to four times as large as said first transconductance;

a secondary pair of third and fourth MOS transistors, said third MOS transistor having a third source electrode connected to a power supply terminal which is supplied with a power supply voltage, and a third transconductance which is equal to said first transconductance, said fourth MOS transistor having a fourth gate electrode connected to a third gate electrode of said third MOS transistor, a fourth source electrode connected to said power supply terminal, and a fourth transconductance which is equal to said first transconductance;

- a first resistor connected between said first drain electrode and said first base electrode;
- a second resistor connected between said first gate electrode and a fourth drain electrode of said fourth MOS transistor, said second resistor having a primary resistance value;
- a third resistor connected between a second drain electrode of said second MOS transistor and a third drain electrode of said third MOS transistor, said third resistor having a secondary resistance value which is equal to said primary resistance value;
- a fifth MOS transistor having a fifth source electrode connected to said power supply terminal, a fifth gate electrode connected to said third gate electrode, and a fifth drain electrode connected to said fifth gate electrode; and
- a sixth MOS transistor having a sixth source electrode grounded, a sixth gate electrode connected to said second drain electrode, and a sixth drain electrode connected to said fifth drain electrode.

27. A reference voltage circuit as claimed in claim 26, wherein a voltage drop is caused across said first resistor which has a temperature, said voltage drop being substantially equal to a thermal voltage in said temperature.

28. A reference voltage circuit comprising:

- a primary pair of first and second MOS transistors, said first MOS transistor having a first source electrode grounded and a first transconductance, said second MOS transistor having a second gate electrode connected to a first gate electrode of said first MOS transistor, and a second transconductance which is equal to four times as large as said first transconductance;
- a secondary pair of third and fourth MOS transistors, said third MOS transistor having a third drain electrode connected to a second drain electrode of said second MOS transistor, a third source electrode connected to a power supply terminal which is supplied with a power supply voltage, and a third transconductance which is equal to said first transconductance, said fourth MOS transistor having a fourth gate electrode connected to a third gate electrode of said third MOS transistor, a fourth drain electrode connected to said third and said fourth gate electrodes and a first drain electrode of said first MOS transistor, a fourth source electrode connected to said power supply terminal, and a fourth transconductance which is equal to said first transconductance;
- a first resistor connected between said first source electrode and ground;
- a fifth MOS transistor having a fifth gate electrode connected to said third drain electrode, a fifth source electrode connected to said power supply terminal, and a fifth transconductance which is equal to two times as large as said first transconductance;
- a sixth MOS transistor having a sixth gate electrode connected to said second gate electrode, a sixth drain electrode connected to said sixth gate electrode, a sixth source electrode grounded, and a sixth transconductance which is equal to said fifth transconductance;
- a second resistor connected between a fifth drain electrode of said fifth MOS transistor and said sixth drain electrode of said sixth MOS transistor; and
- an output voltage terminal connected to a node of said fifth drain electrode and said second drain electrode.

* * * * *